United States Patent
Graham et al.

(10) Patent No.: US 10,953,918 B2
(45) Date of Patent: Mar. 23, 2021

(54) SELF-PROPELLED VEHICLES INCLUDING A DIFFERENTIAL SYSTEM

(71) Applicant: Vermeer Manufacturing Company, Pella, IA (US)

(72) Inventors: Curt T. Graham, Lynnville, IA (US); Nathan D. Dockter, Pella, IA (US); Kent M. Recker, Pella, IA (US); Gary J. Burns, Knoxville, IA (US); Kent L. Thompson, Otley, IA (US); Scott A. Rempe, Pella, IA (US); Jeffrey T. Knapp, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 296 days.

(21) Appl. No.: 16/099,599

(22) PCT Filed: May 19, 2017

(86) PCT No.: PCT/US2017/033615
§ 371 (c)(1),
(2) Date: Nov. 7, 2018

(87) PCT Pub. No.: WO2017/201452
PCT Pub. Date: Nov. 23, 2017

(65) Prior Publication Data
US 2019/0126748 A1    May 2, 2019

Related U.S. Application Data

(60) Provisional application No. 62/338,812, filed on May 19, 2016.

(51) Int. Cl.
*B62D 11/02*     (2006.01)
*B62D 11/24*     (2006.01)

(52) U.S. Cl.
CPC .............. *B62D 11/02* (2013.01); *B62D 11/24* (2013.01)

(58) Field of Classification Search
CPC ................................ B62D 11/02; B62D 11/24
See application file for complete search history.

(56) References Cited

U.S. PATENT DOCUMENTS 2,651,377 A    9/1953  Lapsley et al.
2,818,125 A    12/1957 Vogelaar
(Continued)

FOREIGN PATENT DOCUMENTS

CA    2852288 A1    11/2015
EP    1943894 A2    7/2008
(Continued)

OTHER PUBLICATIONS

International Search Report and Written Opinion for International Application No. PCT/US17/33615, dated Oct. 12, 2017,12 pages.
(Continued)

*Primary Examiner* — Kevin Hurley
(74) *Attorney, Agent, or Firm* — Armstrong Teasdale LLP

(57) ABSTRACT

Self-propelled vehicles that include swiveling caster wheels and independent drive wheels are disclosed. The self-propelled vehicles are selectively steered in a caster wheel steering mode or a drive wheel steering mode. The vehicle includes a differential system that may include a differential valve that allows hydraulic fluid to be transferred between the left and right drive systems. The differential system may be operable during the caster wheel steering mode such as when the vehicle is driven for transport between sites.

20 Claims, 13 Drawing Sheets

(56) References Cited

U.S. PATENT DOCUMENTS

| | | | |
|---|---|---|---|
| 3,075,233 A | 1/1963 | Lorenz | |
| 3,234,856 A | 2/1966 | Martin | |
| 3,612,199 A | 10/1971 | Vissers et al. | |
| 3,888,323 A | 6/1975 | Patton et al. | |
| 4,077,490 A | 3/1978 | Casterton et al. | |
| 4,320,810 A | 3/1982 | Hillmann et al. | |
| 5,515,669 A | 5/1996 | Schick et al. | |
| 6,076,613 A | 6/2000 | Frasier et al. | |
| 6,668,965 B2 | 12/2003 | Strong et al. | |
| 7,237,629 B1 | 7/2007 | Bland et al. | |
| 7,549,279 B2 | 6/2009 | Mérant et al. | |
| 7,918,304 B2 | 4/2011 | Perry et al. | |
| 8,186,697 B2 | 5/2012 | Stephenson et al. | |
| 8,267,205 B2 | 9/2012 | Ishii et al. | |
| 8,496,256 B2 | 7/2013 | Bebernes et al. | |
| 8,657,041 B2 | 2/2014 | Ishii et al. | |
| 8,690,171 B2 | 4/2014 | Clark | |
| 8,700,269 B2 | 4/2014 | Hubalek et al. | |
| 8,733,770 B2 | 5/2014 | Nafziger et al. | |
| 8,893,831 B2 | 11/2014 | Otto et al. | |
| 8,950,520 B2 | 2/2015 | Hauser et al. | |
| 8,997,902 B2 | 4/2015 | Pierce et al. | |
| 9,120,504 B2 | 9/2015 | Bebernes et al. | |
| 9,380,737 B2 | 7/2016 | Bebernes et al. | |
| 9,421,999 B2 | 8/2016 | Rotole et al. | |
| 9,439,341 B2 | 9/2016 | Bebernes et al. | |
| 9,930,824 B2* | 4/2018 | Nafziger | A01B 69/007 |
| 2005/0115746 A1 | 6/2005 | Dunn et al. | |
| 2007/0295545 A1* | 12/2007 | Romig | B60W 10/08 180/197 |
| 2009/0152828 A1 | 6/2009 | Bebernes et al. | |
| 2011/0254241 A1 | 10/2011 | Piontek et al. | |
| 2012/0232760 A1 | 9/2012 | Hubalek et al. | |
| 2013/0075169 A1 | 3/2013 | Otto | |
| 2014/0138165 A1* | 5/2014 | Bebernes | B62D 11/005 180/6.3 |
| 2014/0138166 A1 | 5/2014 | Otto et al. | |
| 2015/0039171 A1 | 2/2015 | Koike et al. | |
| 2015/0151781 A1 | 6/2015 | Hauser et al. | |
| 2015/0191201 A1 | 7/2015 | Schaedler et al. | |
| 2015/0223386 A1 | 8/2015 | Nafziger et al. | |
| 2016/0037706 A1* | 2/2016 | Bebernes | B62D 5/091 180/403 |
| 2016/0037707 A1* | 2/2016 | Bebernes | B62D 11/003 180/6.48 |
| 2016/0039452 A1* | 2/2016 | Rotole | B62D 1/22 180/414 |
| 2019/0047541 A1* | 2/2019 | Dockter | A01B 69/008 |
| 2020/0214203 A1* | 7/2020 | Young | A01D 41/1278 |

FOREIGN PATENT DOCUMENTS

| | | |
|---|---|---|
| GB | 2309014 A | 7/1997 |
| TW | 201111188 A | 4/2011 |
| WO | 2009059396 A1 | 5/2009 |
| WO | 2014017089 A1 | 1/2014 |

OTHER PUBLICATIONS

Épandage de compost de fumier de champignon, 1 page, retrieved from https://youtu.be/qILw11KW4Kc, Jan. 28, 2015.

New Holland Braud VL 6080 Grape Harvester, 1 page, retrieved from https://www.youtube.com/watch?v=Xn5wuyyx3bA, Aug. 29, 2014.

Chapter 3 Pneumatic 3 Position Cylinders, 1 page, retrieved from https://www.youtube.com/watch?v=NGWKghY-w0A, Mar. 19, 2014.

International Search Report and Written Opinion for International Application No. PCT/US17/33596, dated Oct. 13, 2017, 15 pages.

Challenger: WR Series Self-Propelled Windrowers, AGCO Corporation, 2015, 28 pages.

New Holland, Speedrower Self-Propelled Windrower, 1 page, available before May 19, 2018.

WR Series RearSteer, 1 page, retrieved from https://youtu.be/DQZdRhqCSo, Aug. 27, 2015.

* cited by examiner

SELF-PROPELLED VEHICLES INCLUDING A DIFFERENTIAL SYSTEM

CROSS-REFERENCE TO RELATED APPLICATION

This application is a 35 U.S.C. § 371 national stage application of PCT/US2017/033615, filed May 19, 2017, which claims the benefit of U.S. Provisional Patent Application No. 62/338,812, filed May 19, 2016, each of which is incorporated herein by reference in its entirety.

FIELD OF THE DISCLOSURE

The field of the disclosure relates to self-propelled vehicles that include swiveling caster wheels and independent drive wheels and, in particular, self-propelled vehicles that may be steered in a caster wheel steering mode and a drive wheel steering mode.

BACKGROUND

Self-propelled implements such as agricultural implements are often used at various sites that are separated by large distances. The implement is transported on a trailer or is towed or propelled over the road system. Implements which include a dedicated propulsion system (e.g., sprayers, windrows or the like) may be difficult to steer at high speed as the implements are designed for field steering during their agricultural operation.

A need exists for new vehicles that are self-propelled, that are highly maneuverable during use and that are controllably steered at high speeds and that improve operator ride while providing sufficient maneuverability.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a self-propelled vehicle. The vehicle includes a chassis and first and second drive wheels connected to the chassis. First and second drive systems are connected to the first and second drive wheels for independently controlling a rotational drive speed of each of the first and second drive wheels. Caster wheels are connected to the chassis. A steering system is selectively operable between a drive wheel steering mode and a caster wheel steering mode. The steering system controls a swivel position of the caster wheels to steer the vehicle in the caster wheel steering mode. The steering system controls the speed difference between the first and second drive wheels to steer the vehicle in the drive wheel steering mode. A differential system is connected to the drive systems of the first and second drive wheels to enable the first and second drive wheels to operate at different speeds in the caster wheel steering mode.

Yet a further aspect of the present disclosure is directed to a self-propelled vehicle. The vehicle includes a chassis and first and second drive wheels connected to the chassis. First and second drive systems are connected to the first and second drive wheels. Each of the first and second drive systems includes a pump and a motor. A caster wheel is connected to the chassis. A steering system is connected to the caster wheel. A differential valve is connected to the motors of the first and second drive systems. The differential valve selectively transfers fluid between the motors to enable the motors to rotate the first and second wheels at different speeds.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
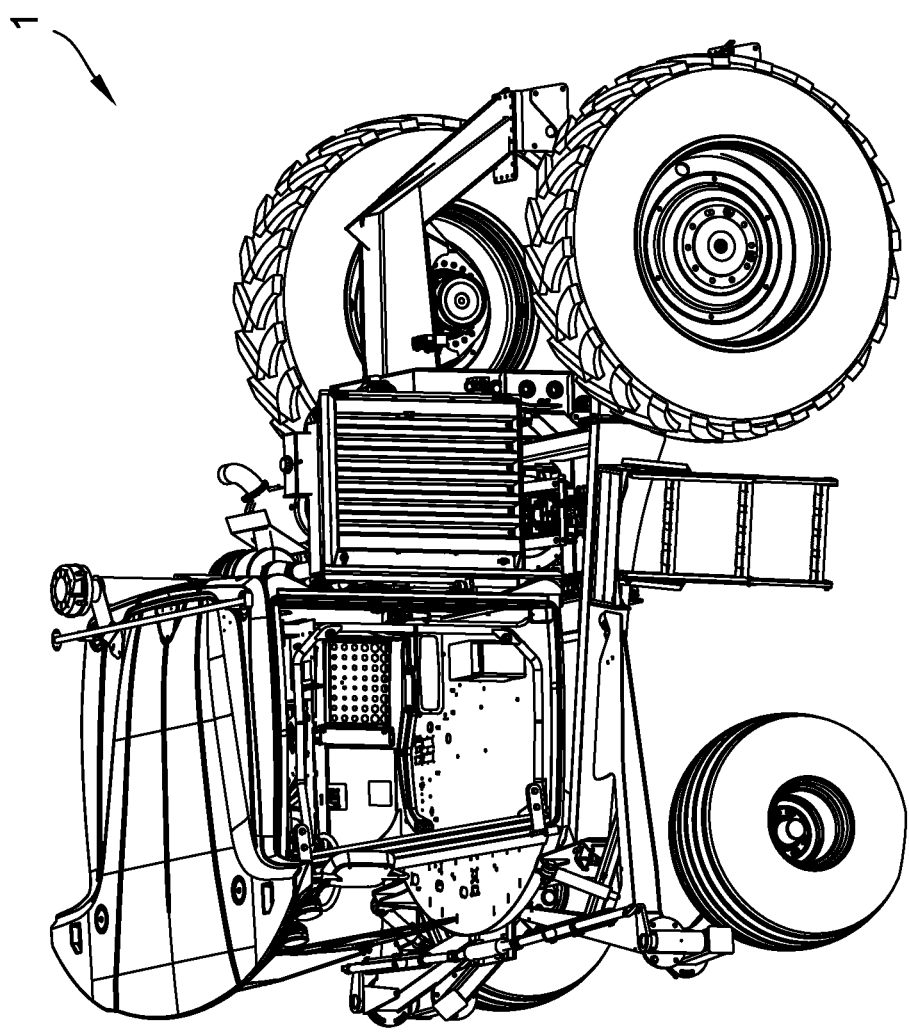
FIG. 1 is a perspective view of a self-propelled vehicle.

FIG. 1 shows an embodiment of a self-propelled vehicle 1. In the embodiment illustrated in FIG. 2, the vehicle includes a baling device 5 for forming a bale of crop or forage material. In other embodiments, the self-propelled vehicle 1 may be an agricultural vehicle such as a rake, mower or mower conditioner, merger, sprayer, windrower, broadcast spreader, nut or fruit harvester or the like. In other embodiments, the vehicle 1 is configured for non-agricultural use (e.g., construction, shipping or the like). Reference herein to the baling device 5 should not be considered limiting and any suitable device may be substituted for the baling system unless stated differently. (e.g., cutting or mower head, sickle bar, spray tank and/or booms, harvesting devices (e.g., grape or nut harvesting devices), broadcast spreader or the like). In some embodiments, the vehicle 1 is adapted to carry a load (e.g., bale, herbicide, fertilizer, or harvested crop such as nuts or fruits).

The device 5 (e.g., baling device 5) is supported by a chassis 9. In embodiments in which the device is a baler, the vehicle also includes a pick-up device 11 (FIG. 3) that rotates to feed crop or forage material to the baling device 5. The vehicle 1 is controlled from an operator station 13 and is powered by an engine 101. Each of the operator station 13, engine 101 and device 5 are supported by the chassis 9 (i.e., the engine 101 is not part of a towed vehicle such as a tractor that releasably connects to the device by a hitch assembly attached to an implement tongue).

The vehicle 1 includes first and second front caster wheels 27 and first and second rear drive wheels 17. The term "caster wheel" includes a wheel mounted to a frame or chassis at a generally vertically oriented caster pivot so that the caster wheel is able to swivel about the caster pivot.

Each of the wheels 17, 27 is connected to the chassis 9 and can be rotated around a rotational axis $R_{17}$, $R_{27}$. In the illustrated embodiment, the drive wheels 17 have a common rotational axis $R_{17}$ and the caster wheels 27 have a common rotational axis $R_{27}$. In other embodiments, the drive wheels 17 are offset from each other and have different axes of rotation and/or the caster wheels 27 are offset from each other and have different axes of rotation. In this embodiment, the vehicle 1 includes four wheels, though in other embodiments, the vehicle may include any number of drive and caster wheels.

As shown in FIGS. 1-4, the drive wheels 17 have a diameter that is larger than a diameter of the caster wheels 27. In some embodiments, the ratio of the diameter of the drive wheels 17 to the diameter of the caster wheels 27 is at least about 1.25:1 or at least about 1.5:1 or even at least about 3:1.

Figure 2:
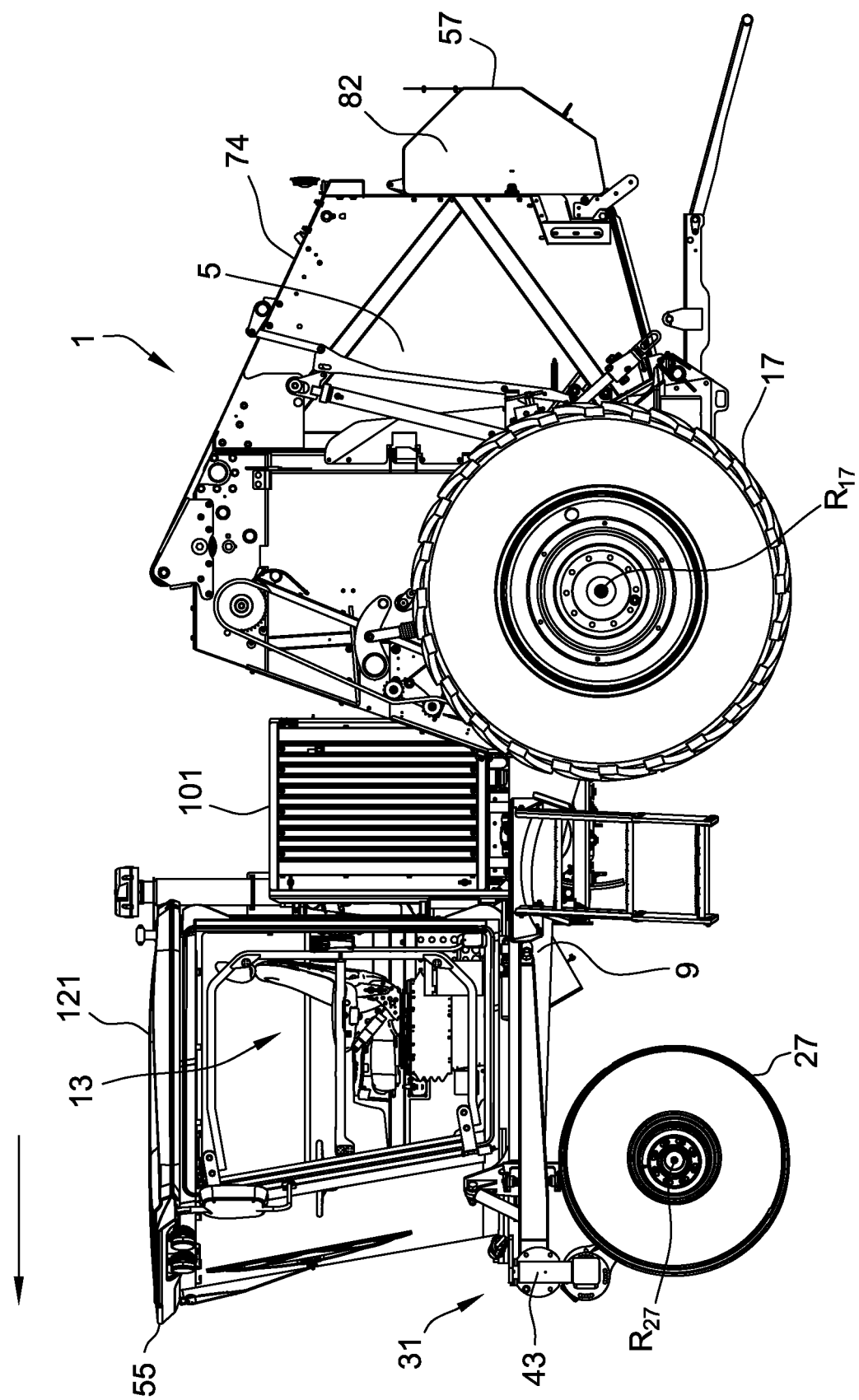
FIG. 2 is a side view of a self-propelled vehicle shown as a baling vehicle.

The first and second caster wheels 27 are pivotally connected to the chassis 9 (FIG. 2). The caster wheels 27 and/or drive wheels 17 may be spaced to allow the chassis 9 to support a device (e.g., agricultural implement) such as a round baler 5 and pick-up device 11 as shown in the illustrated embodiment. In some embodiments, the vehicle 1 includes a single front caster wheel 27.

Figure 6:
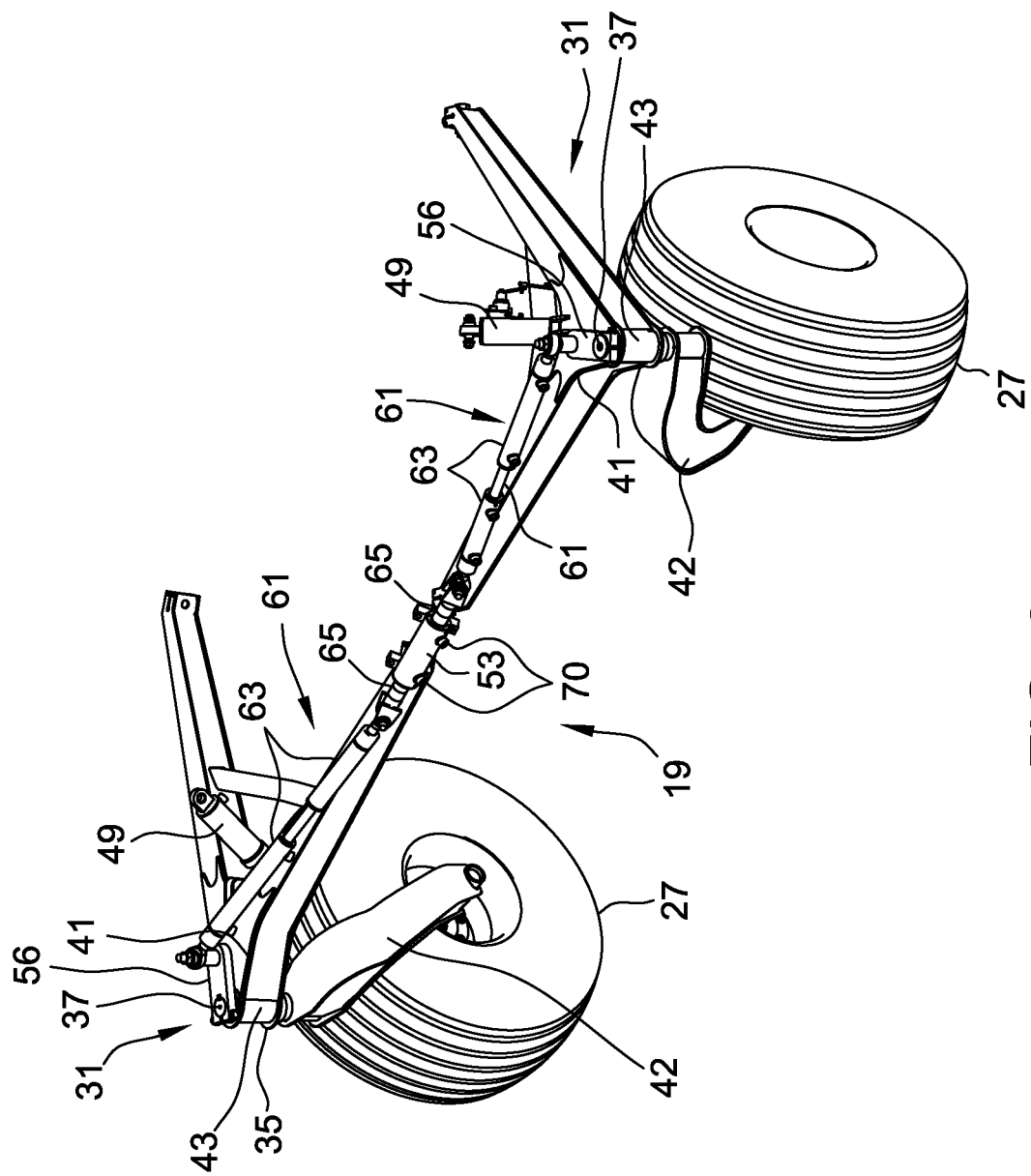
FIG. 6 is a perspective view of a portion of the self-propelled vehicle including caster assemblies.

With reference to FIG. 6, in the illustrated embodiment the caster wheels 27 are independently suspended from the chassis 9 (FIG. 2) to absorb forces transmitted during travel over uneven terrain. In other embodiments, the vehicle 1 does not include a caster wheel suspension system.

The drive wheels 17 are fixed to the chassis 9 such that the wheels 17 maintain parallel alignment with a longitudinal axis A (FIG. 4) of the vehicle 1 (i.e., do not pivot with respect to the chassis). The longitudinal axis A of the vehicle extends from a front 55 to a rear 57 of the vehicle 1. As referenced herein, the "front" of the vehicle refers to a leading portion or end of the vehicle relative to the longitudinal axis during conventional operation as indicated by the arrow in FIG. 2. The "rear" refers to the trailing portion or end relative to the longitudinal axis during conventional operation. Similarly, the terms "front wheels" and "rear wheels" refer to the relative position of the wheels relative to the direction of travel of the vehicle during conventional operation. The vehicle also includes a lateral axis B (FIG. 4) that extends from a first side 58 (FIG. 3) to a second side 59 of the vehicle 1 and that is transverse to the longitudinal axis A.

In a drive wheel steering mode, the vehicle 1 is steered by creating a differential speed between the first and second rear drive wheels 17 (i.e., by creating a difference between the first drive wheel rotational speed and the second drive wheel rotational speed). In this mode, each drive wheel 17 is capable of being driven forward or in reverse independent of the speed and direction of the other wheel (i.e., the drive wheels may be operated in counter-rotation). As an operator controls a steering mechanism (e.g., steering wheel), the rear drive wheels 17 rotate at different speeds to steer the vehicle 1 through an arc or deviation in the travel pathway. The speed and direction of travel (forward or rearward) may be controlled by a separate operator control. In the drive wheel steering mode, the vehicle 1 may be turned within its own footprint. In this mode, the caster wheels 27 self-align with the direction in which the drive wheels propel the vehicle, i.e., the caster wheels 27 follow the direction of travel of the rear drive wheels 17.

In a caster wheel steering mode, the swivel position of the caster wheels 27 may be controlled to steer the vehicle. As used herein, the "swivel position" of the caster wheels generally refers to the angular position of the caster wheels relative to the longitudinal axis A (FIG. 4) of the vehicle. The caster wheels 27 are connected to a steering system 19 (FIG. 6) which controls the swivel position of the caster wheels 27. As such, the vehicle 1 may travel at high speeds and the caster wheels 27 may be steered to prevent wobbling or other uncontrolled movement.

In the caster wheel steering mode, the drive wheels 17 rotate at different speeds as the vehicle 1 is steered through a curved path. In this mode, the drive wheels 17 rotate in the same direction with the speed and direction of rotation being controlled by an operator. The relative speed of the drive wheels 17 is compensated by engaging a differential system 8 (FIG. 5) that allows the relative rates of rotation of the drive wheels to match the arc defined by the swivel position of the caster wheels 27.

Figure 5:
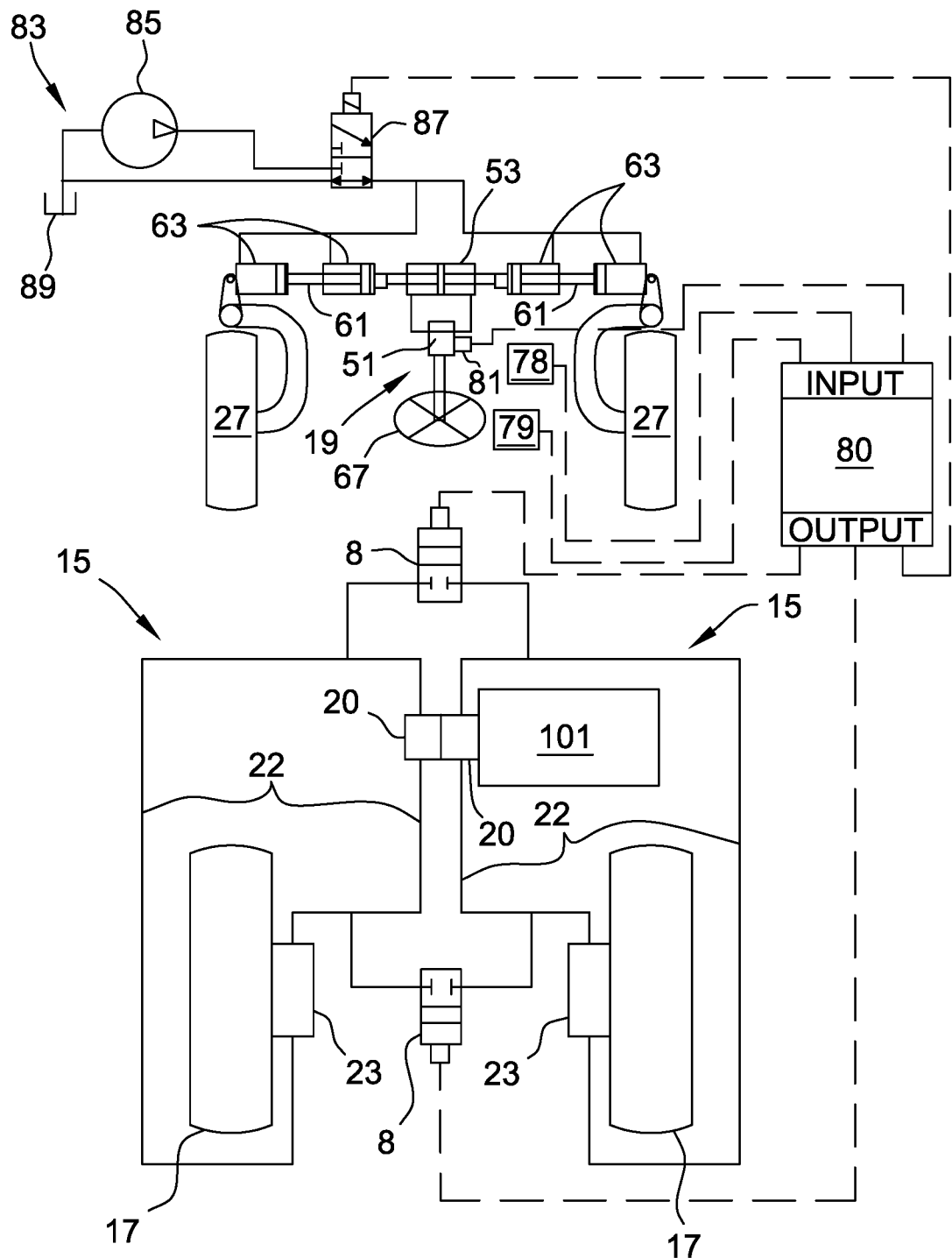
FIG. 5 is a schematic view of the self-propelled vehicle showing the drive systems.

With reference to FIG. 5, the first and second drive wheels 17 are each driven and controlled by separate drive systems 15. Each drive system 15 has a drive motor 23 for rotating the drive wheel 17 forward or backward. The drive motors 23 may be hydraulic motors that are driven by a pump 20 that is powered by the engine 101. Each drive wheel 17 may be controlled by a separate circuit (i.e., separate hydraulic pumps 20 with fluid lines 22 connected to the drive wheel motors 23). The first and second pumps 20 may be hydrostatic, variable displacement pumps. In some embodiments, fixed displacement or variable displacement motor(s) may be used.

The wheels 17 are powered and rotated independently by the drive systems 15. Accordingly, the wheels 17 can be rotated at different speeds by driving the motors at different speeds. In the drive wheel steering mode, the wheels 17 are driven at different speeds by the drive system 15. In this mode, the motors 23 receive different amounts of fluid from the respective pumps 20 to differentiate the speed of the wheels 17. Separate fluid lines 22 extend between each pump 20 and drive motor 23 to independently rotate the wheels 17. The direction of fluid flow may be forward or reverse to independently rotate the wheels forward or reverse to propel the vehicle forward, reverse, through an arc (e.g., as during steering) or about a vertical axis midway between the drive wheels 17 (e.g., as during zero turn steering).

In a caster wheel steering mode, the pumps 20 are powered equally but the wheels 17 are able to rotate at different speeds due to a differential system (shown as differential valves 8) that transfers fluid between the drive systems. The valves 8 may be components of a single valve block or may be separate valves. In some embodiments, each differential valve 8 is activated to an open position in the caster wheel steering mode to allow fluid to transfer between the drive systems 15 to cause the drive wheels 17 to rotate at different speeds to follow the arc defined by the caster wheels 27 during steering. The valves 8 may operate to be fully opened or closed or, as in other embodiments, may be proportional valves.

Generally, any hydraulic valve 8 that allows the valve to be controllably opened and closed may be used. The valve 8 may be a directional control valve, solenoid on/off valve, electro-proportional valve, or the like and/or may be electrically (e.g., solenoid), hydraulically or manually actuated. The vehicle 1 may generally include any hydraulic differential system that enables the vehicle to operate as described unless stated differently.

As shown in FIG. 6, the caster wheels 27 may be part of first and second swivel caster assemblies 31. The first and second caster assemblies 31 are connected to the chassis 9 (FIG. 2) and the swivel position of the caster wheels 27 is selectively controlled by the steering system as determined by the mode of operation of the vehicle (i.e., caster wheel steering mode or drive wheel steering mode). Generally the first and second caster assemblies 31 and subframes 41 described below are symmetric and description herein of an assembly or subframe also applies to the second assembly or subframe (e.g., description of a hub of the assembly indicates that the first assembly has a first hub and that the second assembly has a second hub). Each assembly 31 includes a hub 35 and a caster shaft 37 that rotates within the hub 35. The swivel caster assemblies 31 may include bushings or bearings within the hub 35 that allow for rotation of the shaft 37 within the hub 35. Each caster shaft 37 is connected to a leg assembly 42 that connects to the caster wheel axle. In the illustrated embodiment, the leg assembly 42 includes a single leg that attaches to an inner side of the wheel axle. In other embodiments, the leg assembly includes two legs that connect to the axle of the caster wheel on each side of the wheel (as with a caster fork).

Figure 7:
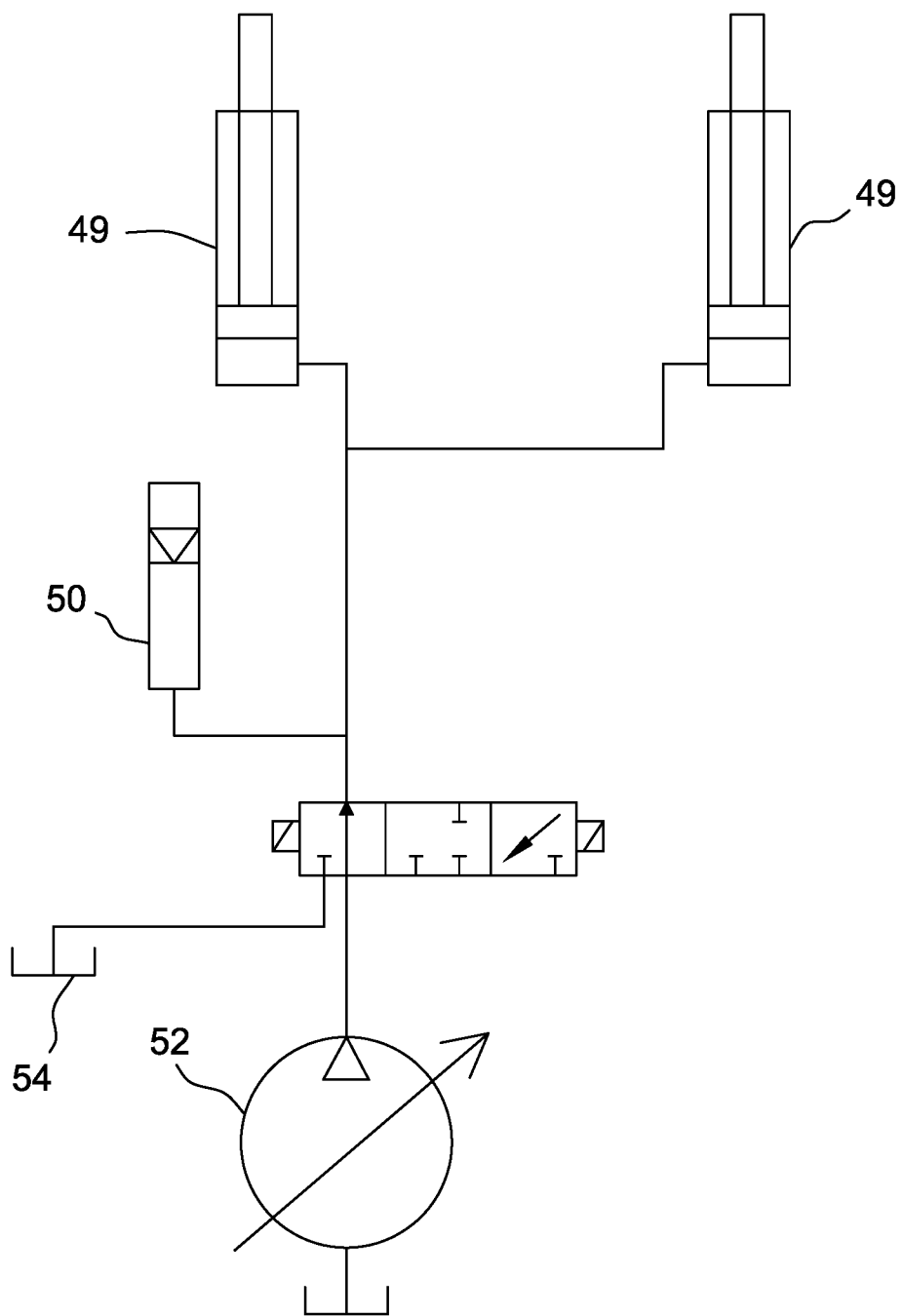
FIG. 7 a schematic view of the vehicle showing a hydraulic suspension system.

The first and second caster wheels 27 of the caster assemblies 31 are each connected to the subframe 41 by a swivel joint 43 formed by the hub 35 and shaft 37. The subframes 41 are suspended from the chassis 9 by a mechanism having a suspension element 49, shown as a hydraulic cylinder in the illustrated embodiment. With reference to FIG. 7, each cylinder 49 may be connected to an accumulator 50 in the suspension system with the hydraulic fluid being provided from a source 54 by a hydraulic pump 52. Other suspension elements such as shock absorbers may be used in other embodiments.

Figure 8:
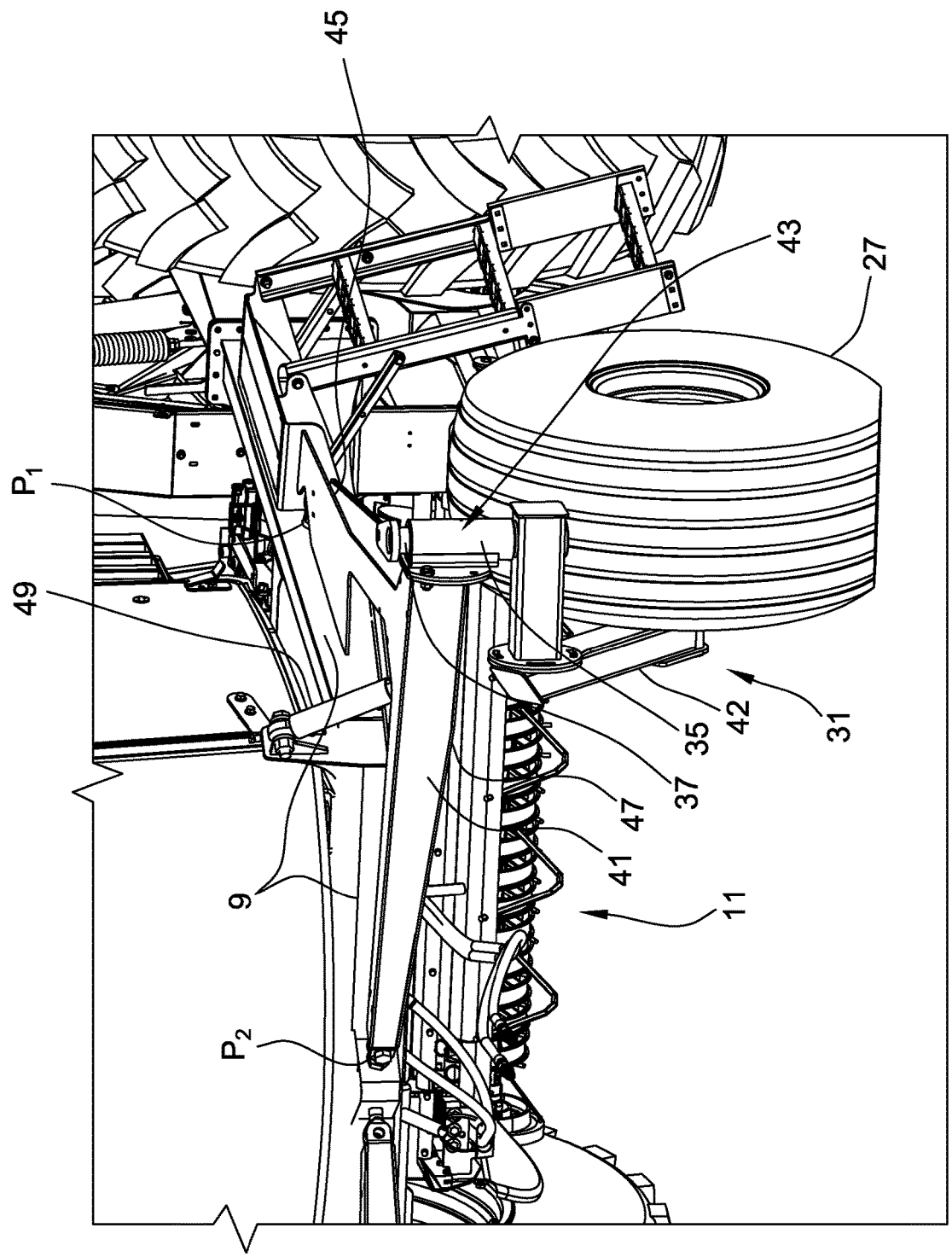
FIG. 8 is a perspective view of a caster assembly of the self-propelled vehicle.

With reference to FIG. 8, each subframe 41 is also pivotally attached to the chassis 9 at an outer pivot point $P_1$ and an inner pivot point $P_2$. In this arrangement, the chassis 9 is supported by the subframes 41 and the chassis 9 and components carried by the chassis 9 (e.g., operator station and cab) may move up and down relative to the subframes 41 as the vehicle 1 travels over uneven terrain.

As shown in FIG. 8, the subframe 41 has two legs 45, 47 that extend from the chassis 9. The swivel joint 43 is at the point at which the legs 45, 47 meet and is forward of the inner and outer pivot points $P_1$, $P_2$ relative to a longitudinal axis A (FIG. 4) of the vehicle. The swivel joint 43 is also outward to both the inner and outer pivot points $P_1$, $P_2$ relative to the lateral axis B (FIG. 4) of the apparatus 1 (i.e., the outer pivot point $P_1$ of each subframe 41 is positioned between the inner pivot point $P_2$ and the point of attachment of the suspension element 49 relative to the lateral axis B).

In other embodiments, the subframe 41 may have a single leg or may include any other arrangement of components that allows the caster wheels 27 to be positioned below the chassis 9 to support the vehicle.

In the drive wheel steering mode, the caster wheels 27 are freely pivotable (i.e., are not steered or otherwise controlled). As a result, the caster assemblies 31 allow the first and second caster wheels 27 to self-align with the direction of travel of the vehicle while it is steered by the difference in the speed of rotation of the drive wheels 17. As shown in FIG. 2, each of the first and second caster wheels 27 is offset from the swivel joint 43. In other words, the axes of rotation $R_{27}$ of the first and second caster wheels 27 do not intersect axes of rotation of the swivel joints 43. The first and second caster wheels 27 pivot independently from each other in the drive wheel steering mode.

In the caster wheel steering mode, the caster wheels 27 are engaged by the steering system and used for steering. In the preferred embodiment, the differential valves 8 (FIG. 5) are opened (e.g., by energizing solenoids) with equal output from the drive wheel pumps 20 with the differential speeds of the drive wheels 17 being enabled by fluid flow through the differential valves 8. In an alternative embodiment (i.e., a hybrid steering mode), the differential valves 8 are opened and the output from the drive wheel pumps 20 is varied to the two drive wheels 17. In this hybrid mode, the swivel position of the caster wheels 27 is controlled and the relative speeds of the drive wheels 17 is also controlled (e.g., similar to the drive wheel steering mode) based on an approximation of how the speed of the drive wheels 17 will vary in order to provide the curve that is consistent with the swivel position of the caster wheels 27.

With reference to FIGS. 5 and 6, the steering system 19 selectively engages a steering linkage to control the swivel position of the caster wheels 27 in the caster wheel steering mode. The steering system 19 may include a mechanical and/or electrical coupling mechanism to selectively engage the steering system with the caster wheels 27.

With reference to FIGS. 5 and 6, in the illustrated embodiment the steering system 19 includes an orbital valve 51, a steering cylinder 53 and first and second tie rods 61 with each tie rod being connected to an opposite side of the steering cylinder 53. The orbital valve 51 regulates fluid flow to the steering cylinder 53 based on input from a steering mechanism such as a steering wheel 67. The steering system 19 may include a steering pump (not shown) to provide the fluid flow.

The steering cylinder 53 is a double acting cylinder having a through rod 65 that extends from each side which pushes/pulls the tie rods 61 to commonly align the caster wheels 17 during caster wheel steering. The steering cylinder 53 includes inlet and outlet ports 70. Fluid flows through the ports 70 in a first direction to cause the through rod 65 to move to cause both caster wheels 27 to be steered. Fluid is caused to flow in the opposite direction to actuate the through rod 65 in the opposite direction, and to cause the caster wheels to be steered in the opposite direction.

Each tie rod 61 connects to a linkage 56 connected to the caster assembly shafts 37. The tie-rods 61 include disengagement cylinders 63 to enable selective steering of the caster wheels 27. In the caster wheel steering mode, the disengagement cylinders 63 are locked in an extended position such that actuation of the steering cylinder 53 causes pivoting movement of the caster wheels 27 (i.e., the tie-rods 61 are a fixed length). In the drive wheel steering mode, the disengagement cylinders 63 are allowed to float (i.e., fluid is allowed to freely flow with little or no pressure), thereby disengaging the movement of the steering cylinder 53 from the caster wheels 27 (i.e., the tie-rods 61 are variable in length). As such, actuation of the steering cylinder 53 will not be translated through the disengagement cylinders 63 to the caster wheels 27 and the castor assemblies 31 will be allowed to freely pivot in the drive wheel steering mode.

The disengagement cylinders 63 are connected to a hydraulic system 83 that regulates the fluid flow to the cylinders 63. The hydraulic system 83 includes a pump 85, a valve 87, a hydraulic fluid tank 89, and fluid lines 91. In caster wheel steering mode, the valve 87 allows oil into the cylinders to lock-out the disengagement cylinders 63 with pressure created by pump 85. In the drive-wheel steering mode, valve 87 is shifted to allow fluid to freely flow in and out of the disengagement cylinders 63 and back to the tank 89.

In alternative embodiments, the vehicle 1 may include any steering system 19 that enables the vehicle to operate as described. For example, the steering system 19 may include any of the following components, without limitation: tie-rods, rack and pinion mechanisms, orbital valves, cylinders, motors, and bell cranks. In some embodiments, the castor assemblies 31 are locked by manual and/or automatic mechanisms that prevent the castor assemblies from freely pivoting such as during the drive wheel steering mode.

In some embodiments, the steering system 19 is adapted to steer the caster wheels 27 through a steering angle that is limited, such as by the range of travel of the steering cylinder 53. The operator may sense when the steering system 19 is in the stopped position as further movement of the steering wheel in the clockwise or counterclockwise position is prevented.

The vehicle 1 includes a control system to control the drive wheels 17 and front caster wheels 27 based on inputs from an operator. The control system includes a control unit 80, speed and direction control device 78, a mode selector 79 and steering mechanism which is shown as a steering wheel 67. The speed and direction control device 78, mode selector 79 and steering wheel 67 may be controlled from the operator station 13.

The control unit 80 includes a processor and a memory. The processor processes the signals received from various sensors, selectors and control devices of the system. The memory stores instructions that are executed by the processor.

Control unit 80 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable control unit 80, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Wash.). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

The mode selector 79 allows the operator to select a desired mode of operation (i.e., drive wheel steering mode or caster wheel steering mode). The control unit 80 receives the signal from the mode selector 79 and controls the mode of the steering system in response to the signal. The mode selector 79 may be, for example, part of a touch screen, a soft key, toggle switch, selection button or any other suitable interface for selecting the steering mode.

The speed and direction control device 78 is typically hand-operated and may be a sliding lever that that causes an increase in forward speed as the lever is slid forward of a neutral position and an increase in reverse direction as the lever is slid rearward of the neutral position. The direction and speed control device 78 produces a signal in response to its position and the signal is transmitted to the control unit 80. The control unit 80 produces an output signal transmitted to the hydraulic pumps 20 that drive the rear wheels 17. The speed may also be controlled by a throttle that controls the engine speed. The vehicle 1 may be stopped by moving the direction and speed control device 78 to a zero-speed setting and/or by operating foot brake levers.

In the illustrated embodiment, steering may be performed by a steering mechanism shown as a steering wheel 67 which regulates the steering system. For example, in the drive wheel steering mode, a sensor 81 measures the direction and angle of the steering wheel 67 and sends signals to the control unit 80. The control unit 80 produces a signal that is transmitted to the hydraulic pumps 20 to independently regulate the rotational speeds of the first and second drive wheels 17 (i.e., the rotation speed and direction of rotation of each drive wheel 17).

In other embodiments, speed and/or steering may be controlled by different operator controls such as wheel levers, digital inputs, joysticks, dual sticks, and headsets.

Figure 9:
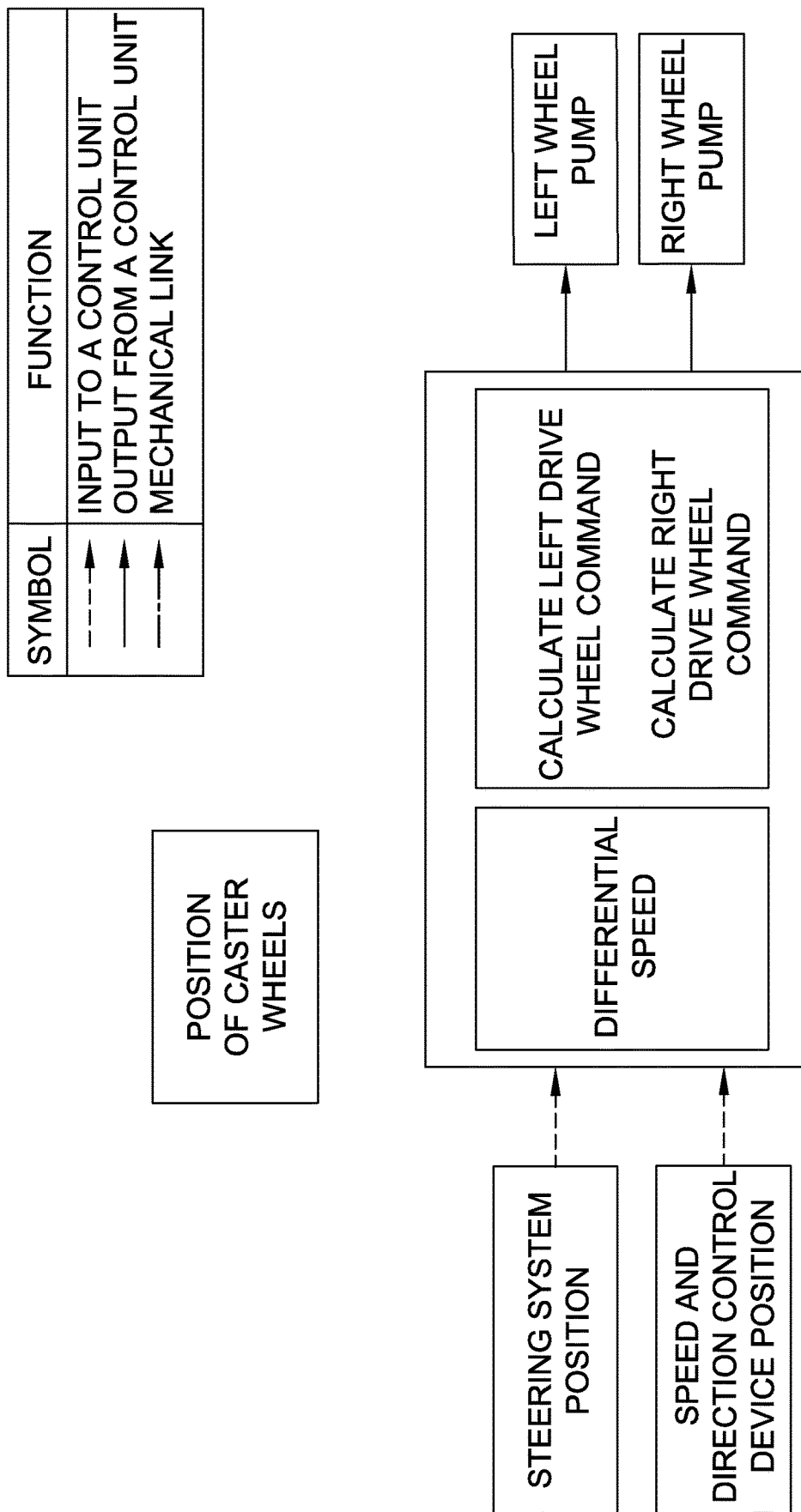
FIG. 9 is a flow diagram of a drive wheel steering mode of the self-propelled vehicle.
Figure 10:
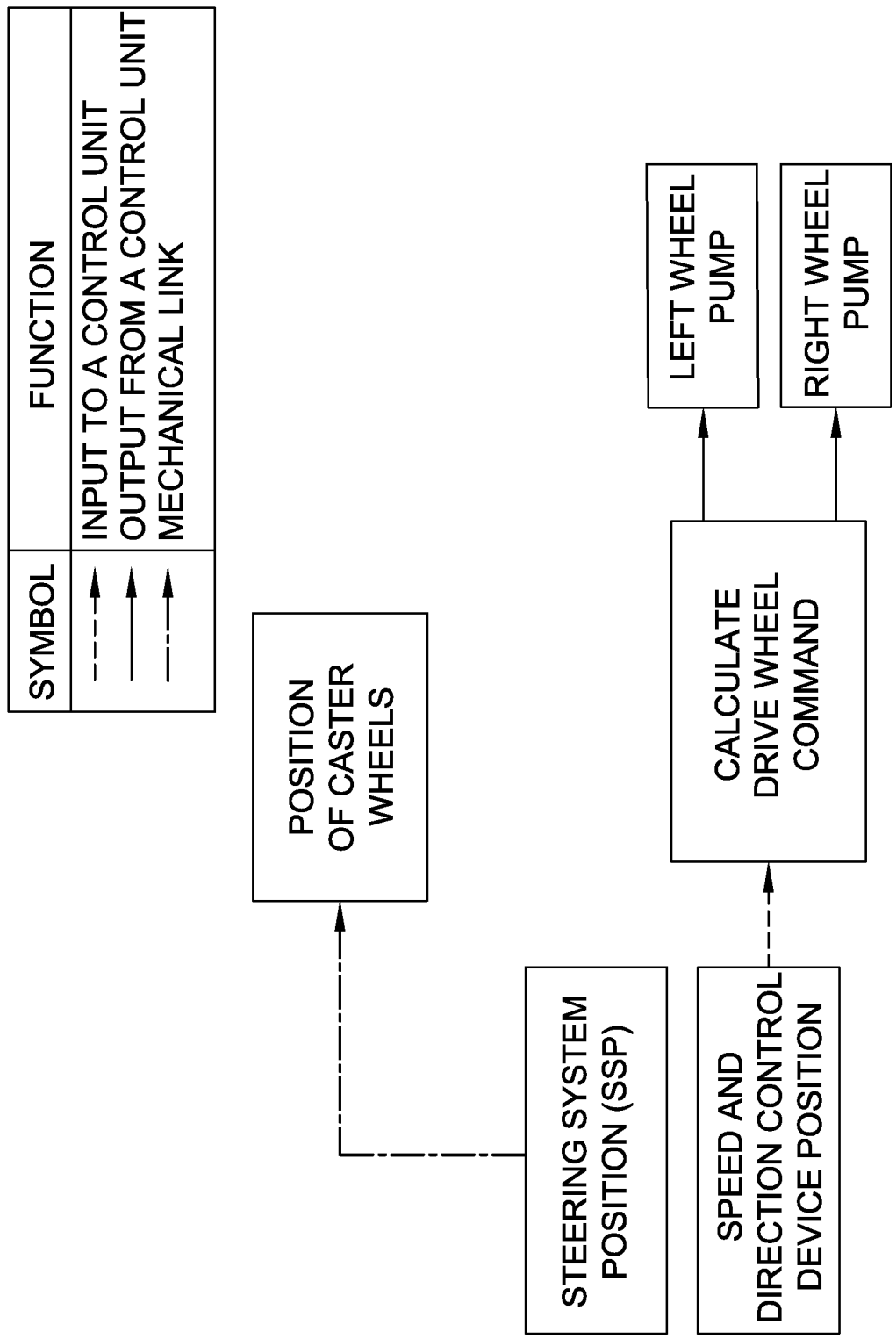
FIG. 10 is a flow diagram of a caster wheel steering mode of the self-propelled vehicle.

With reference to FIGS. 9 and 10, the vehicle 1 may be operated in either a field mode in which the self-propelled vehicle is steered by the rear drive wheels or a transport mode in which the caster wheels are used to steer the vehicle. The drive wheel steering mode is shown in FIG. 9. As shown, the orientation of the caster wheels is not controlled by a mechanical steering link or by output from the controller. The orientation of the caster wheels is independent from the steering system position and the position of the directional control device. The caster wheels follow the direction of travel of the vehicle as steered through rotation of the first and second drive wheels.

With further reference to FIG. 9, the steering system position (e.g., as measured by steering wheel sensor) sends a signal to a control unit. A signal related to the position of the speed and direction control device is also sent to the control unit. The steering position signal and the speed and direction control device position signal are used to calculate a speed differential that generates a turning radius of the self-propelled vehicle. A left drive wheel command and right drive wheel command are generated and transmitted to the left drive wheel pump and the right drive wheel pump. The commands control the output from the pumps (e.g., hydraulic output and direction of flow). In the drive wheel steering mode, the self-propelled vehicle may be operated by rotating the drive wheels at different speeds to steer the apparatus over an arc or in more aggressive manners in which one wheel remains stationary while the other wheel is rotated, or a zero-turn-radius mode where the drive wheels are rotated in opposite directions. In some embodiments, zero-turning may be disabled when the self-propelled baler travels above a predetermined speed.

The self-propelled vehicle 1 may also be selectively operated in a caster wheel steering or transport mode, as shown in FIG. 10. In the caster wheel steering mode of FIG. 10, the caster wheels steer the vehicle rather than the rear drive wheels. The steering system mechanically controls the orientation of the caster wheels such as by the steering system of FIG. 6. The speed and direction control device position signal is transmitted to a control unit to calculate a drive wheel command, with the left and right drive systems being controlled equally. In the transport mode of FIG. 10, the drive wheels are used to control the vehicle speed and not to steer the vehicle. The differential valve 8 of the differential system is opened to allow hydraulic flow to be transferred between the drive systems of the left and right rear wheels (e.g., upon cornering and the like) to improve maneuverability of the vehicles.

Figure 11:
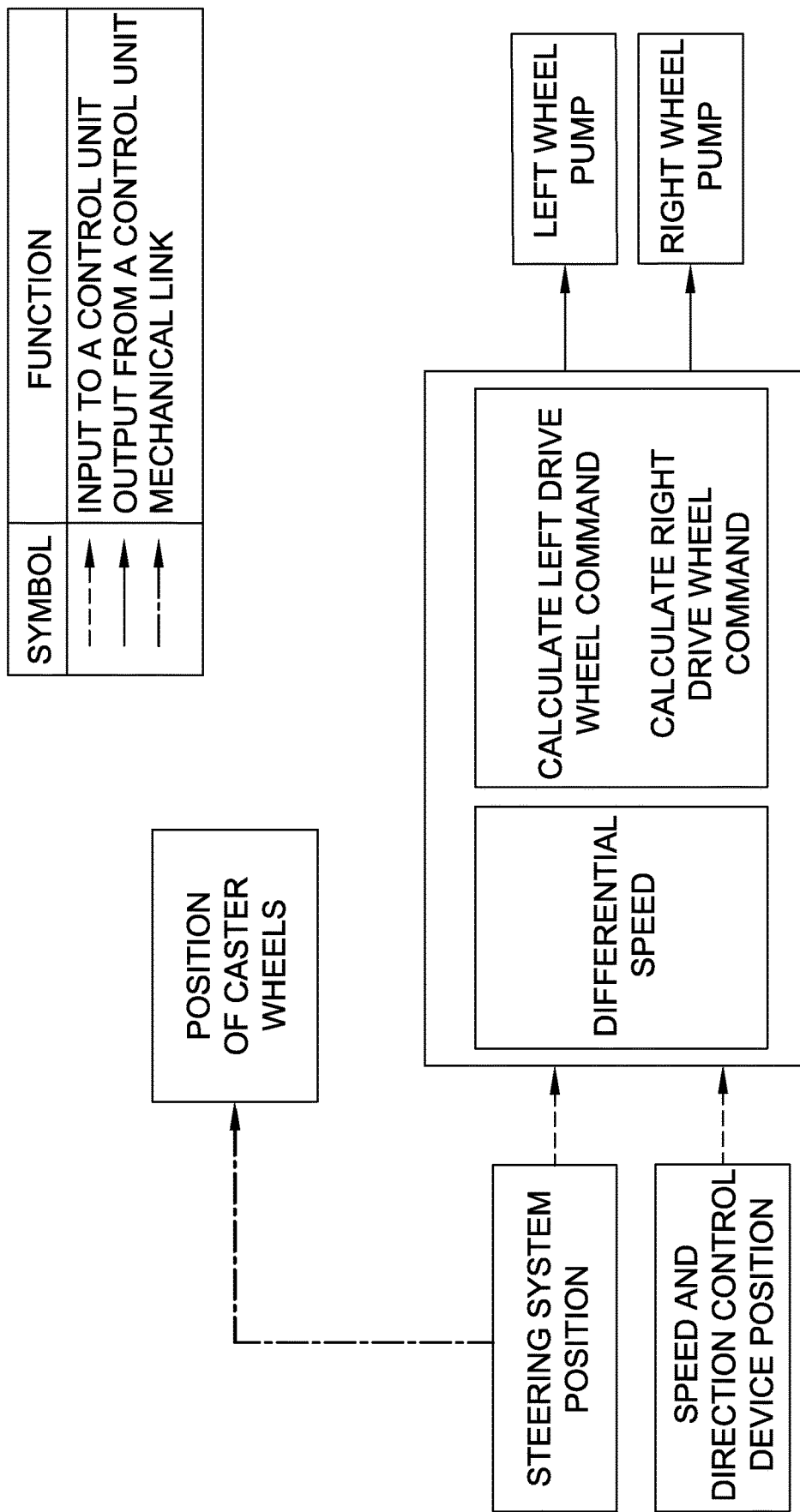
FIG. 11 is a flow diagram of a hybrid steering mode of the self-propelled vehicle.

In some embodiments and as shown in FIG. 11, the self-propelled vehicle 1 may be operated in a hybrid mode. The steering system mechanically controls the position of the caster wheels with the differential valves opened. The drive wheels are also controlled for steering based on the steering system position. The control unit determines the speed at which the drive wheels should vary in order to provide the curve that is consistent with the swivel position of the caster wheels.

In some embodiments, the self-propelled vehicle 1 is configured for autonomous operation. The vehicle may include sensors (e.g., cameras, GPS sensors and the like) that sense the position of a windrow and/or that may sense the position of the vehicle in the field. The vehicle 1 may also include a control unit that autonomously sends signals to control the vehicle speed and steering systems. In some embodiments, the field in which the vehicle is propelled is mapped and the field map is used to autonomously control the operation of the vehicle in the field. In such embodiments, the vehicle may include a riding station to carry an operator or the operator station may be eliminated.

Figure 3:
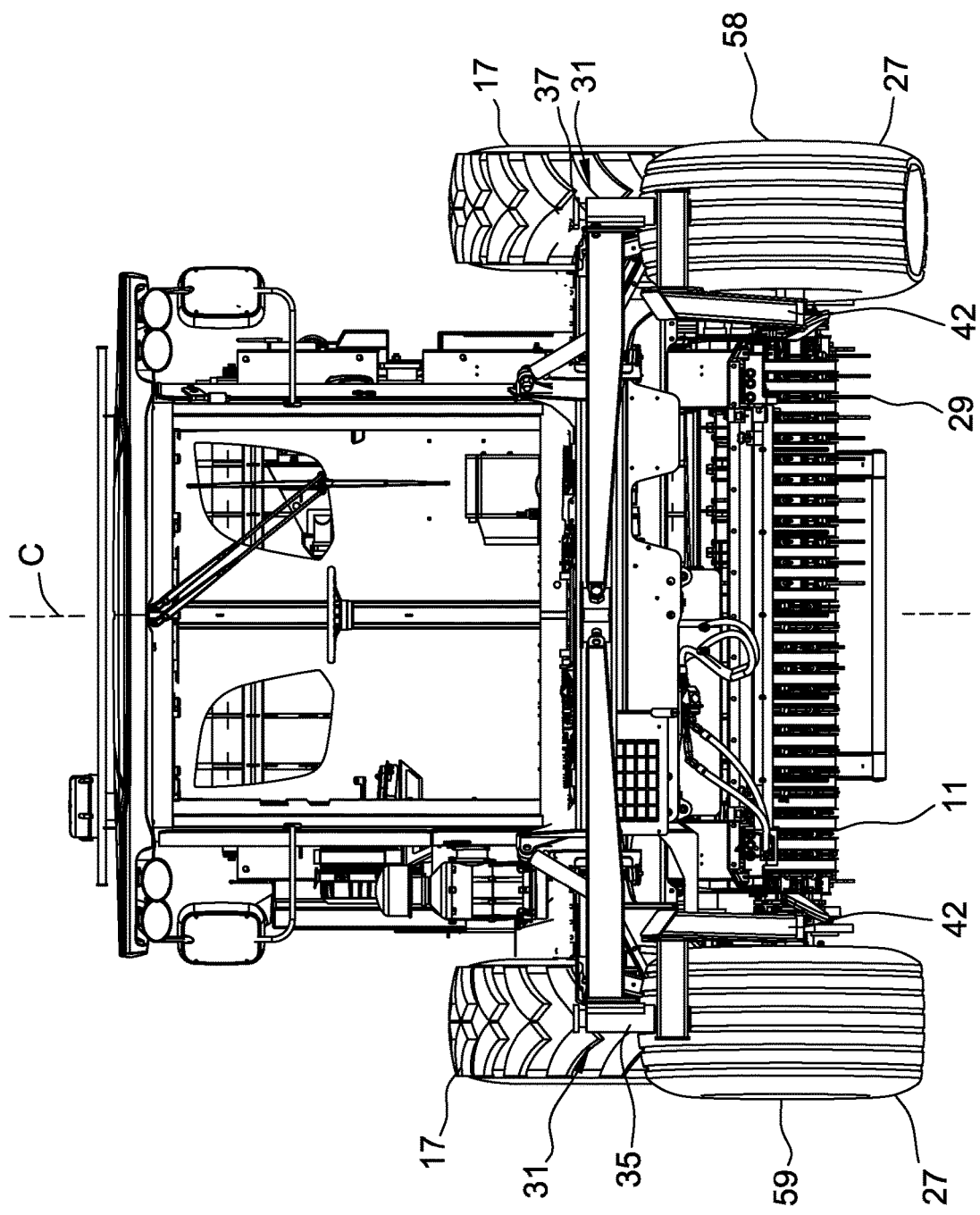
FIG. 3 is a front view of the self-propelled vehicle.
Figure 4:
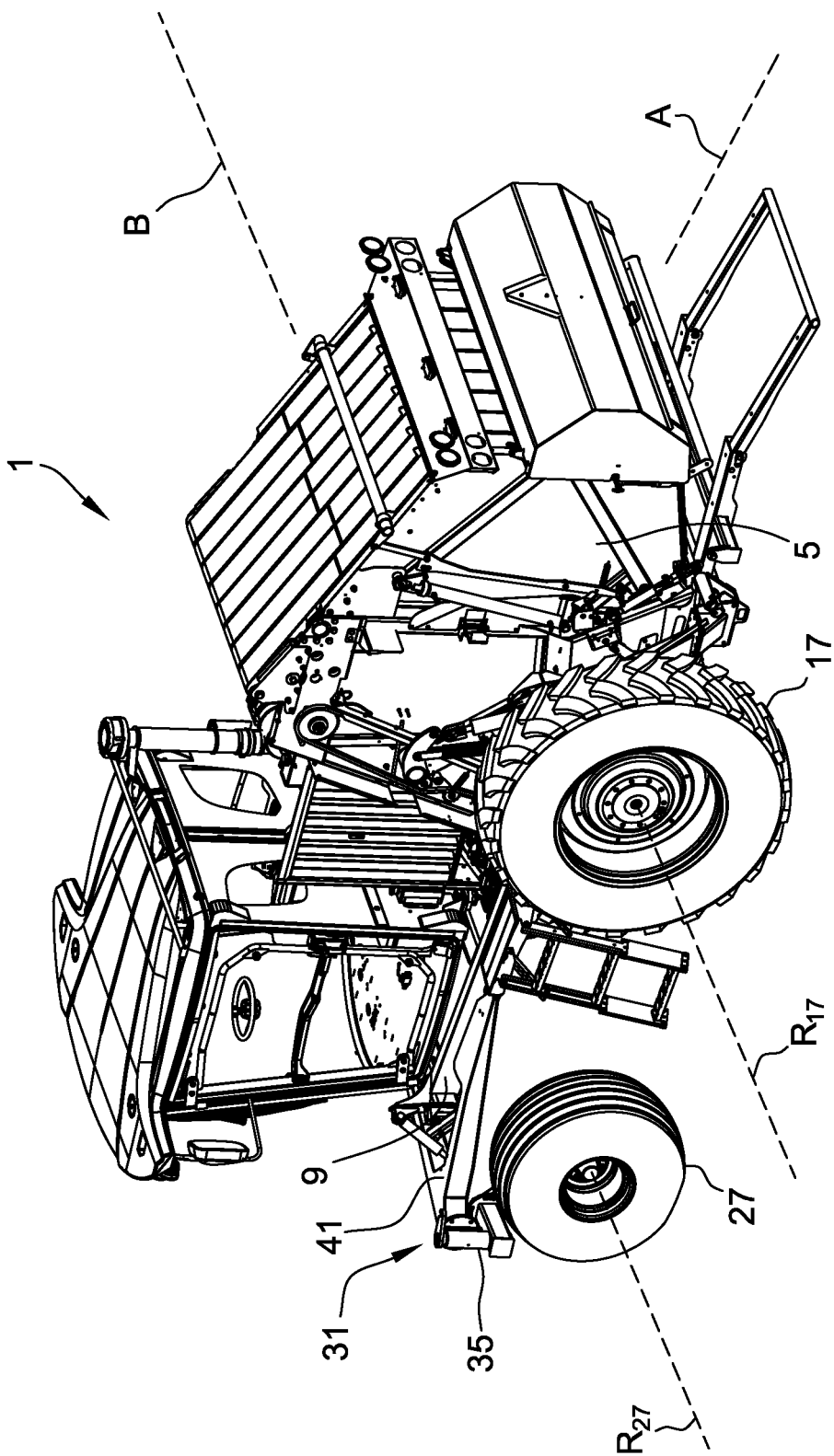
FIG. 4 is a perspective view of the self-propelled vehicle.

In reference to FIGS. 2-4, in embodiments in which the vehicle 1 is used to bale forage or crop material, the vehicle also includes a baling device 5 that includes belts, rollers, belt tighteners, and a motor that drives the rollers. In this embodiment, the baler forms bales in an expandable baling chamber, though, in other embodiments, the baler may be a fixed chamber baler. In the baling chamber, multiple belts are routed around the rollers and moved as a bale is formed, though a single bale forming belt may alternatively be used. In this embodiment, tension is maintained in the bale forming belts by the one or more belt tighteners to ensure a properly compressed bale.

The baler includes a pick-up device 11 (FIG. 3) to pick up crop or forage material. The pick-up device 11 is shown in a raised position. During baling, the pick-up device 11 is in a lowered position in which the rotating teeth of the device contact the crop or forage material and direct it toward the baling chamber. As material is picked up by the pick-up device, and deposited in the baling chamber, the material is compressed by the plurality of bale forming belts. In this embodiment, the pick-up device is powered by a motor.

During operation of the baler, the baler moves across a field and along a windrow. The windrow may be formed by a mechanism, such as rakes, connected to the baler. Alternatively, the windrow may have been previously formed. The pick-up device collects material from the field and delivers the material to the baling chamber. The bale forming system forms the material into a bale within the baling chamber. Once a full bale is formed, a wrapping sequence is commenced by the wrapping mechanism 82. Once the wrapping sequence is completed, a tailgate 74 is opened and the full bale is discharged from the baling chamber and guided away from the baler by a ramp. Further details relating to the baling operation within the baling chamber can be found in U.S. Pat. No. 7,181,900, which is incorporated herein by reference.

The engine 101 (e.g., gas or diesel powered engine) drives one or more hydraulic pumps which in turn power the various hydraulic motors and cylinders (e.g., first and second drive wheel motors, baling chamber motor, pick-up device motor, pick-up device lift cylinder, lift-gate cylinder and/or ramp cylinder). The engine 101 also provides power for the electrical systems of the vehicle. The engine 101 is between the rotational axes $R_{17}$ of the rear drive wheels 17 and the rotational axes $R_{27}$ of the caster wheels 27. More specifically, the engine 101 is between the baling chamber and the operator station 13.

In some embodiments, the "operator station" comprises the seat and controls for steering and controlling the speed of the vehicle. As shown in FIG. 2, the operator station 13 is enclosed in a cab 121. The operator station 13 is forward of the baling device 5, forward of the rotational axis $R_{17}$ of the rear drive wheels 17 and is also forward to the engine 101. The cab 121 and operator station 13 may be partially aligned with the rotational axis $R_{27}$ of the caster wheels 27 (the steering wheel may be aligned with the rotational axis $R_{27}$ while the other controls and operator seat are rearward to the rotational axis).

Figure 12:
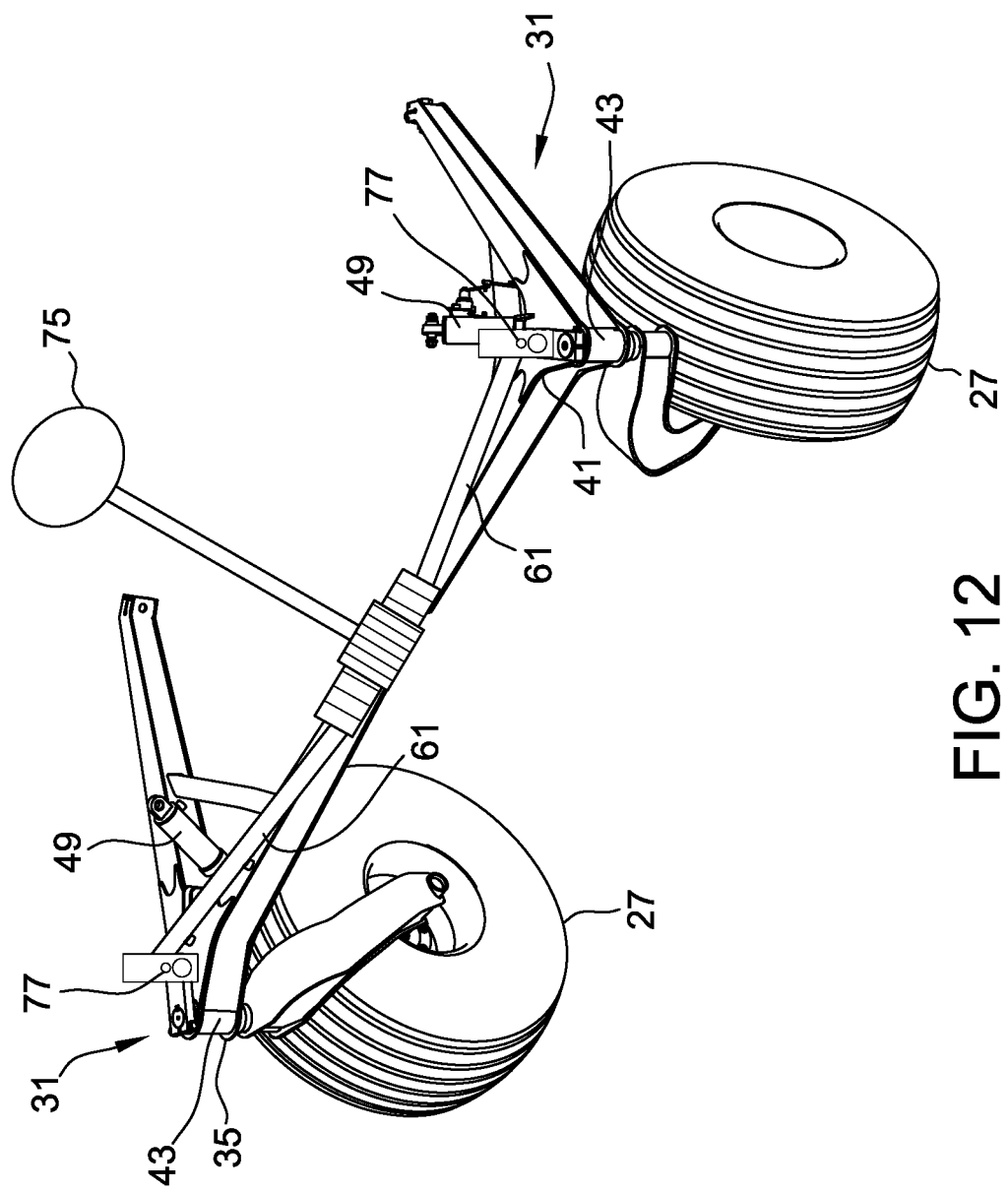
FIG. 12 is a perspective view of a steering system for a self-propelled vehicle including a lockable caster wheel.

FIG. 12 shows a schematic of a portion of a steering system of a self-propelled baling vehicle. The self-propelled baling vehicle is similar to the vehicle shown in FIG. 2 except the vehicle includes a different coupling between the castor assembly 31 and the steering mechanism 75. A tie-rod 61 extends between each castor assembly 31 and the steering mechanism 75. Each castor assembly 31 is rotatably connected to an end of a tie rod 61. In an unlocked mode, the castor assembly 31 freely pivots in relation to the tie rod 61. In a locked mode, the castor assembly 31 moves with and is pivoted by the tie rod 61. An opposite end of the tie rod 61 is connected to the steering mechanism 75 by a geared connection (e.g., rack and pinion or gearbox). Accordingly, actuation of the steering mechanism 75 is transferred through the tie rod 61 to the castor assembly 31. A pin 77 is positionable to selectively lock and unlock the castor assembly 31. The pin 77 may be controlled by automatic and/or manual mechanisms. In alternative embodiments, the castor assembly 31 may include any locking mechanism that enables the vehicle to operate as described.

Figure 13:
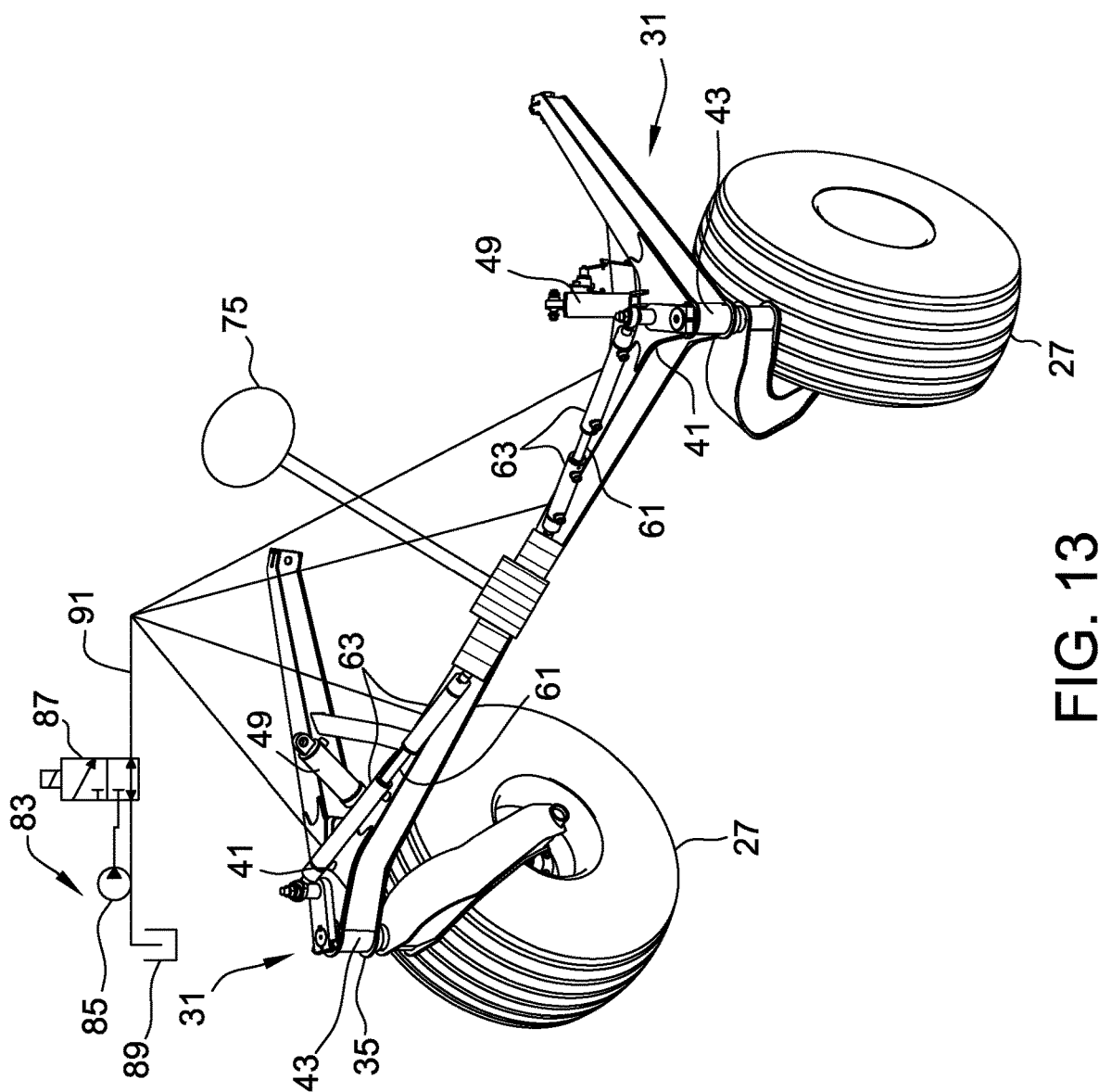
FIG. 13 is a perspective view of a steering system for a self-propelled vehicle including a hydraulic system.

FIG. 13 shows a schematic of a portion of a steering system of a self-propelled baling vehicle. The self-propelled baling vehicle is similar to the vehicle shown in FIG. 2 except the vehicle includes a different coupling between the castor assembly 31 and the steering mechanism 75. In particular, multiple disengagement cylinders 63 extend between the castor assembly 31 and the steering mechanism 75 through a geared connection (e.g., rack and pinion or gearbox). In a locked mode, the cylinders 63 are locked in an extended position to allow the steering mechanism to control the castor assemblies 31. In an unlocked mode, the cylinders 63 float along tie rods 61 such that the castor assemblies are free to rotate. The castor assemblies may rotate 360°.

A hydraulic system 83 is connected to the cylinders 63 and regulates the position of the cylinders. The hydraulic system 83 includes a pump 85, a valve 87, a hydraulic fluid tank 89, and fluid lines 91. Hydraulic fluid is directed into the cylinders 63 to position the cylinders in the locked position. Hydraulic fluid may freely flows from the cylinders 63 and into the tank 89 in the unlocked or float position. The valve 87 can regulate the fluid flow between the pump 85, the tank 89, and the cylinders 63. In alternative embodiments, the vehicle 1 may include any hydraulic system that enables the vehicle to operate as described.

Compared to conventional vehicles, the self-propelled vehicles of the present disclosure have several advantages. By incorporating caster wheels and hydraulic rear drive wheels that rotate independently, the vehicle is highly maneuverable and is able to turn within its own footprint. This allows the vehicle to be turned quickly. By providing a differential system, the drive wheels are allowed to operate at different speeds when the vehicle is in a caster wheel steering mode such as during travel between sites. The caster wheel steering mode provides a more stable and reliable steering system that may enable the machine to operate at faster ground speeds. By including multiple modes of steering, the vehicle is versatile and has an increased operating efficiency.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A self-propelled vehicle comprising:
a chassis;
first and second drive wheels connected to the chassis;
first and second drive systems connected to the first and second drive wheels for independently controlling a rotational drive speed of each of the first and second drive wheels;
caster wheels connected to the chassis;
a steering system selectively operable between a drive wheel steering mode and a caster wheel steering mode, wherein, in the caster wheel steering mode, the steering system controls a swivel position of the caster wheels to steer the vehicle and the first and second drive systems are controlled equally, and, in the drive wheel steering mode, the steering system controls the speed difference between the first and second drive wheels to steer the vehicle; and
a differential system connected to the drive systems of the first and second drive wheels to enable the first and second drive wheels to operate at different speeds to follow an arc defined by the swivel position of the caster wheels during steering of the vehicle in the caster wheel steering mode.

2. The self-propelled vehicle as set forth in claim 1 wherein the differential system comprises a differential valve connected to the drive systems of the first and second drive wheels to enable the first and second drive wheels to operate at different speeds in the caster wheel steering mode.

3. The self-propelled vehicle as set forth in claim 1, wherein, in the drive wheel steering mode, the caster wheels are free to pivot with respect to the chassis in response to differences in the first drive wheel speed and the second drive wheel speed.

4. The self-propelled vehicle as set forth in claim 1, wherein, in the caster wheel steering mode, the caster wheels are connected to the steering system and are controlled by the steering system.

5. The self-propelled vehicle as set forth in claim 1, wherein the first drive system includes a first motor and a first pump connected to the first motor to provide fluid to the first motor, and the second drive system includes a second motor and a second pump connected to the second motor to provide fluid to the second motor, wherein the first pump provides a first fluid flow to the first motor and the second pump provides a second fluid flow to the second motor.

6. The self-propelled vehicle as set forth in claim 5 wherein the first motor is connected to the first drive wheel to rotate the first drive wheel and the second motor is connected to the second drive wheel to rotate the second drive wheel, the first and second pumps being powered by an engine, the engine being supported by the chassis.

7. The self-propelled vehicle as set forth in claim 6, wherein the steering system controls the speed difference between the first and second drive wheels by varying the first and second fluid flows in the drive wheel steering mode.

8. The self-propelled vehicle as set forth in claim 6, wherein the first pump and second pump are powered equally in the caster wheel steering mode, the differential valve adjusting the fluid flow between the first and second drive systems to enable the first and second drive wheels to rotate at different speeds.

9. The self-propelled vehicle as set forth in claim 1, wherein the first and second drive wheels can be driven in different directions when the vehicle is in the drive wheel steering mode and are prevented from rotating in different directions when the vehicle is in the caster wheel steering mode.

10. The self-propelled vehicle as set forth in claim 1 further comprising a control system to selectively operate the steering system in the drive wheel steering mode or the caster wheel steering mode.

11. The self-propelled vehicle as set forth in claim 1 wherein the steering system comprises a steering cylinder for pivoting the caster wheel in the caster wheel steering mode.

12. The self-propelled vehicle as set forth claim 11 wherein the steering system comprises a tie-rod, the tie-rod being locked in position in the caster wheel steering mode and being variable in length in the drive wheel steering mode.

13. The self-propelled vehicle as set forth in claim 12 wherein the tie-rod comprises a disengagement cylinder, the disengagement cylinder being in a fixed position in the caster wheel steering mode and floats in the drive wheel steering mode.

14. The self-propelled vehicle as set forth in claim 1 further comprising an agricultural device supported by the chassis, the agricultural device being selected from the group consisting of a baler, cutting or mower head, sickle bar, spray tank, spray boom, harvesting devices and broadcast spreader.

15. A self-propelled vehicle comprising:
a chassis;
first and second drive wheels connected to the chassis;
first and second drive systems connected to the first and second drive wheels, each of the first and second drive systems including a pump and a motor;
a caster wheel connected to the chassis;
a steering system connected to the caster wheel; and
a differential valve connected to the motors of the first and second drive systems, the differential valve selectively transferring fluid between the motors to enable the motors to rotate the first and second wheels at different speeds.

16. The self-propelled vehicle as set forth in claim 15 wherein each of the first and second drive systems comprise separate fluid lines connecting the pump and the motor, the differential valve connecting the fluid lines of the first and second drive systems.

17. The self-propelled vehicle as set forth in claim 15 comprising a steering system that selectively controls a swivel position of the caster wheel to steer the vehicle.

18. The self-propelled vehicle as set forth in claim 17 wherein the steering system comprises a steering cylinder for controlling the swivel position of the caster wheel.

19. The self-propelled vehicle as set forth in claim 18 wherein the steering system comprises a tie-rod, the tie-rod being locked in position in the caster wheel steering mode and being variable in length in the drive wheel steering mode.

20. The self-propelled vehicle as set forth in claim 19 wherein the tie-rod comprises a disengagement cylinder, the disengagement cylinder being in a fixed position in the caster wheel steering mode and floating in the drive wheel steering mode.

* * * * *